United States Patent [19]

Nourrcier

[11] Patent Number: 5,150,372
[45] Date of Patent: Sep. 22, 1992

[54] FREQUENCY SWEEPING PHASE-LOCKED-LOOP SYNTHESIZER POWER SUPPLY FOR $CO_2$ WAVEGUIDE LASER

[75] Inventor: Charles E. Nourrcier, Lakewood, Calif.

[73] Assignee: Hughes Aircraft Company, Los Angeles, Calif.

[21] Appl. No.: 759,348

[22] Filed: Sep. 13, 1991

[51] Int. Cl.⁵ .............................................. H01S 3/00
[52] U.S. Cl. ........................................ 372/38; 372/18; 372/32; 359/181
[58] Field of Search ............................ 372/38, 32, 18; 359/181

[56] References Cited

U.S. PATENT DOCUMENTS

| | | | |
|---|---|---|---|
| 3,593,189 | 7/1971 | Buhrer | 372/32 |
| 4,833,681 | 5/1989 | Akiyama et al. | 372/32 |
| 4,893,353 | 1/1990 | Iwaoka et al. | 359/181 |
| 4,912,526 | 3/1990 | Iwaoka et al. | 359/181 |

Primary Examiner—Léon Scott, Jr.
Attorney, Agent, or Firm—William J. Streeter; G. S. Grunebach; W. K. Denson-Low

[57] ABSTRACT

A phase-locked-loop frequency synthesizer (18) normally applies a radio frequency (RF) drive signal (DRIVE) to a $CO_2$ waveguide laser (10) at a first frequency which is optimal for continuous laser operation. For lighting the laser (10), a voltage-controlled oscillator (26) of the synthesizer (18) is forced to sweep the frequency of the drive signal (DRIVE) downwardly from a second frequency which is higher than the first frequency, through an intermediate third frequency which is optimal for laser lighting, to the first frequency. The laser (10) is lit during the downward sweep through the third frequency, and thereafter maintained at the first frequency for continuous operation.

22 Claims, 2 Drawing Sheets

FREQUENCY SWEEPING PHASE-LOCKED-LOOP SYNTHESIZER POWER SUPPLY FOR CO2 WAVEGUIDE LASER

BACKGROUND OF THE INVENTION

1. Field of the Invention

The present invention relates to a radio frequency (RF) power supply which is optimally designed for both lighting and continuous operation of a $CO_2$ waveguide laser.

2. Description of the Related Art $CO_2$ waveguide lasers are reliable, low cost, fieldable and versatile devices with applications ranging from surgical to military and industrial. A description of these lasers is found in an article entitled "The Coming Age of Waveguide Lasers", by K. Laakmann et al, SPIE vol. 247 Advances in Laser Engineering and Applications (1980), pp. 74–78. These lasers have various configurations, including transverse or longitudinal operating modes, and DC or RF excitation.

A problem with RF excited or driven $CO_2$ waveguide lasers is that they will not light if the RF excitation is initially applied at the frequency and power level which are optimal for continuous laser operation. For an exemplary laser which operates continuously with maximum efficiency at a frequency of 150 MHz, the RF excitation required to initially light the laser will be on the order of 1 to 5 MHz higher than 150 MHz.

The impedance of the laser is determined by the conditions of the $CO_2$ gas and the physical dimensions of the electrodes. The gas acts like a dielectric material which forms a distributed capacitor in combination with the electrodes. The dielectric constant of the gas changes from the unlit state to the lit state. If the RF impedance matching between the RF drive power supply and the laser is optimized for the lit state, then in the unlit state the frequency must be changed in order to get enough power into the laser for lighting.

With enough RF drive power, the laser can be started at the optimal frequency for continuous operation. However, this requires a higher power RF supply, which is more complicated, larger and more expensive. Due to the high reflected power during initial lighting of the laser, the RF amplifiers within the RF power supply must be protected. This adds additional complication and cost to the RF power supply.

Various expedients have been utilized for initially applying the RF drive power at an increased frequency for lighting, and then switching the RF drive power to the optimal continuous operating frequency after the laser is lit. A prior art circuit arrangement for providing this function includes two voltage-controlled oscillators (VCOs) operating in an open-loop configuration which generate different RF frequencies at their outputs, and a RF switch for selectively connecting the oscillators to the laser at the proper times.

The first VCO generates a drive signal which initially has a frequency higher than the lighting frequency, and sweeps downwardly past the optimal continuous operating frequency. The second VCO generates a drive signal at the optimal continuous operating frequency. The RF switch connects the first VCO to the laser first for lighting, and then switches out the first VCO and switches in the second VCO after the laser has been lit.

Although it is possible to light and operate a $CO_2$ waveguide laser using such a frequency switching arrangement, the timing in switching between the two VCOs is critical. If there is a period of time in which the first VCO has been switched out and the second VCO has not yet been switched in (neither VCO is connected to the laser), the laser may go out. Alternatively, if the second VCO is switched in before the first VCO is switched out (both VCOs are connected to the laser), the laser may follow the frequency of the first VCO down below the optimal continuous operating frequency and go out.

VCOs operating open-loop are subject to significant output frequency variation resulting from temperature drift. The frequency versus output voltage of a typical VCO can deviate by 10 MHz to 20 MHz from one device to another and/or due to temperature effects. This deviation is excessive since the difference between the lighting and continuous operating frequencies of the laser is only 1 MHz to 5 MHz. If the frequency does not sweep high enough, the laser will not light. If the frequency sweeps too low, the laser may go out.

In addition, these circuits are not amenable to automated mass production since manual adjustment or "tweaking" is required to tune the VCOs to the correct frequencies.

SUMMARY OF THE INVENTION

An RF power supply embodying the present invention includes a phase-locked-loop frequency synthesizer for normally applying an RF drive signal to a $CO_2$ waveguide laser at a first frequency which is optimal for continuous laser operation. For lighting the laser, a voltage-controlled oscillator (VCO) of the synthesizer is forced to sweep the frequency of the drive signal downwardly from a second frequency which is higher than the first frequency, through an intermediate third frequency which is optimal for laser lighting, to the first frequency. The laser is lit during the downward sweep through the third frequency, and thereafter maintained at the first frequency for continuous operation.

The present invention exploits the inherent capabilities of a phase-locked loop in order to provide a sweeping RF power supply with greatly improved stability and reliability. The present power supply is small, utilizes readily available and inexpensive components, and may be manufactured on an automated, commercial production basis since no manual adjustment or frequency tuning are required. The temperature drift problems associated with the prior art switching arrangement described above are eliminated, since the present phase-locked-loop synthesizer is operated in a closed-loop configuration with a stable frequency reference. The critical timing requirements are eliminated since there is no switching operation.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
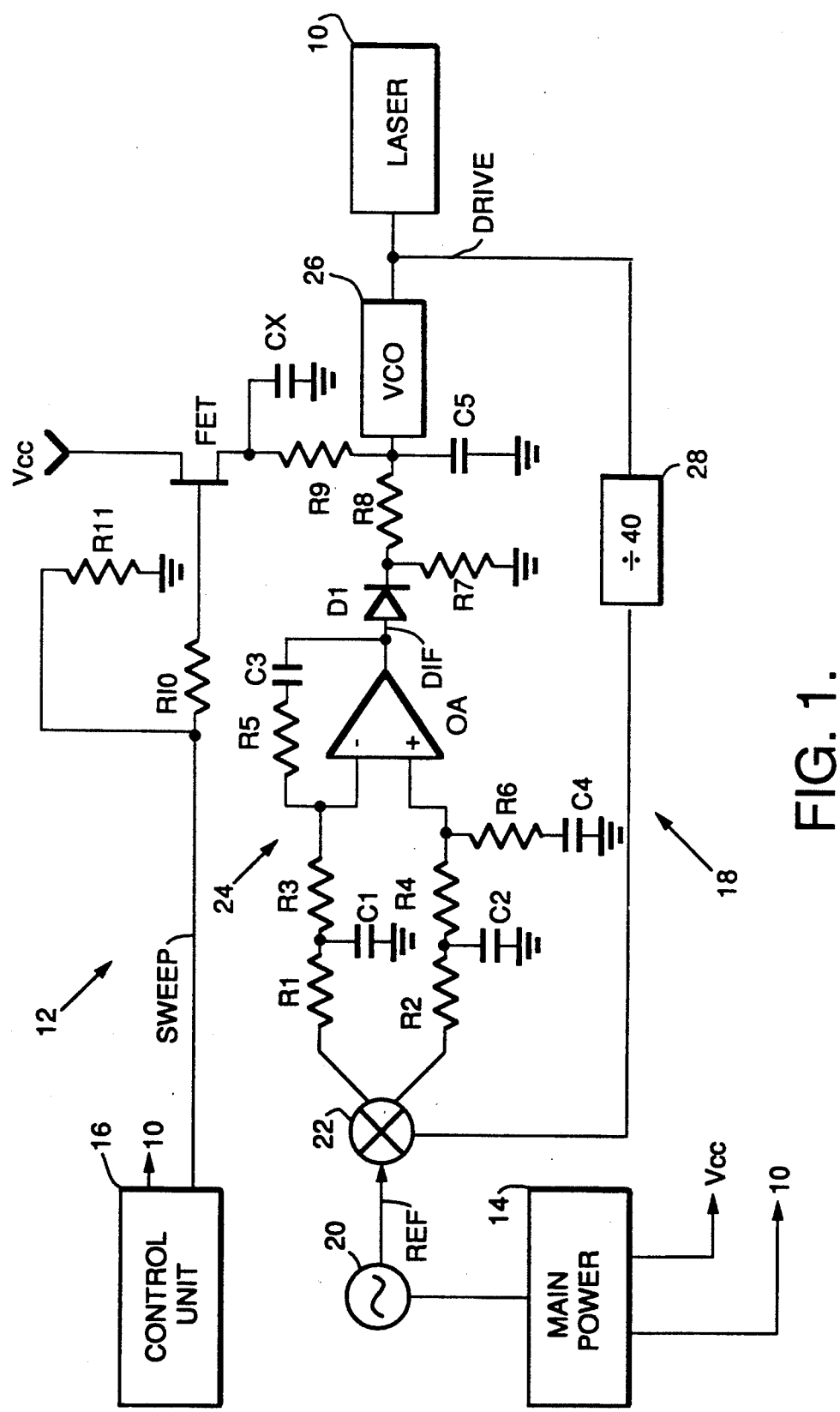
FIG. 1 is an electrical schematic diagram illustrating an RF power supply for a $CO_2$ waveguide laser embodying the present invention.
Figure 2A:
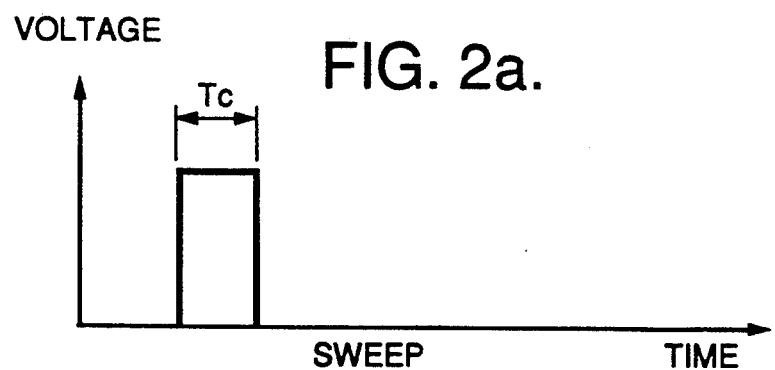
FIGS. 2a to 2c are timing diagrams illustrating the operation of the present power supply.
Figure 2B:
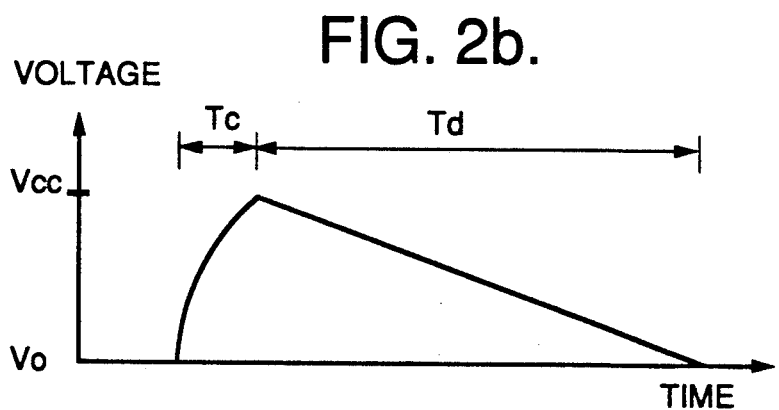
Figure 2C:
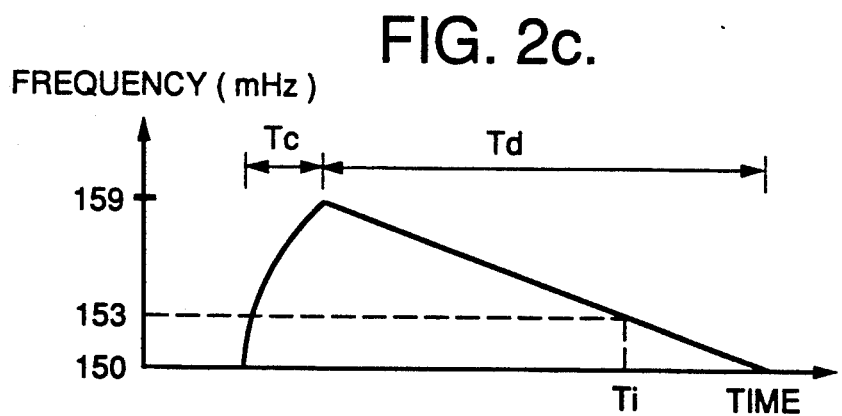

FIG. 1 illustrates an RF excited or driven $CO_2$ waveguide laser 10, which may have a transverse or longitudinal mode configuration as described in the above referenced article to Laakmann et al. An RF power supply 12 includes a main power source 14 which provides DC and AC voltages required for operation of the laser 10 and power supply 12, and a control unit 16 which controls the overall operation thereof. A phase-locked-loop (PLL) synthesizer 18 includes a reference signal generator 20 which generates an RF reference signal REF at a frequency of typically 3.75 MHz. The signal REF is applied to an input of a mixer or phase detector 22.

One branch output of the phase detector 22 is applied through resistors R1 and R3 to the inverting input of an operational amplifier OA. A second branch output of the phase detector 22 is applied through resistors R2 and R4 to the non-inverting input of the amplifier OA. A capacitor C1 is connected between the junction of the resistors R1 and R3 and ground. A capacitor C2 is connected between the junction of the resistors R2 and R4 and ground. A resistor R6 and capacitor C4 are connected in series between the non-inverting input of the amplifier OA and ground. The operational amplifier OA is connected to operate as a loop integrator or and order low pass filter 24, with a resistor R5 and capacitor C3 connected between the output of the amplifier OA and the inverting input thereof in a conventional integrating feedback loop.

The output of the amplifier OA is connected to the anode of a diode D1, the cathode of which is connected through a resistor R8 to the input of a voltage-controlled oscillator (VCO) 26. A resistor R7 is connected between the junction of the diode D1 and resistor R8 and ground. A capacitor C5 is connected between the input of the VCO 26 and ground.

As will be described below, the control unit 16 applies a sweep pulse signal SWEEP through a resistor R10 to the gate of a field-effect transistor FET. The junction of the SWEEP signal output of the control unit 16 and resistor R10 is connected to ground through a resistor R11. The main power source 14 applies a DC voltage Vcc to the drain of the transistor FET, the source of which is connected to the input of the VCO 26 through a resistor R9. A capacitor CX is connected across the input of the VCO 26, more specifically in series with the resistor R9 between the input of the VCO 26 and ground. The output of the VCO 26 is fed back to an input of the phase detector 22 through a frequency divider 28 having an exemplary frequency division ratio of 1:40.

The synthesizer 1B normally functions to produce an RF laser drive or output signal DRIVE which appears at the output of the VCO 26. The output signal DRIVE has an exemplary frequency of 150 MHz which is selected to be optimal for continuous operation of the laser 10. Although not shown in detail, the laser 10 includes a high power amplifier which amplifies the signal DRIVE and applies it to the laser optical assembly with suitable impedance matching.

More specifically, the VCO 26 produces the signal DRIVE at a frequency which corresponds to the voltage applied to the input thereof. The frequency of the signal DRIVE is divided by a factor of 40 by the divider 28. The phase detector 22 compares the phase of the frequency divided signal DRIVE with the reference signal REF, and generates a difference signal corresponding to the phase difference therebetween. The difference signal is fed through the two output branches of the phase detector 22 to the low pass filter 24 which attenuates any RF components in the difference signal. The filtered difference signal, which is designated as DIF, has a DC voltage corresponding to the phase difference between the reference signal REF and output signal DRIVE. The signal DIF is applied to the input of the VCO 26 which generates the output signal DRIVE at a frequency corresponding to the voltage of the difference signal DIF. The synthesizer 18 normally functions to lock the frequency of the output signal DRIVE at 150 MHz, which is optimal for continuous operation of the laser 10. The frequency (150 MHz) of the output signal DRIVE is equal to the frequency (3.75 MHz) of the reference signal REF multiplied by the frequency division ratio (40) of the divider 28.

As discussed above, the optimal frequency for lighting the laser 10 is somewhat above the optimal frequency for continuous operation. Where the laser 10 is optimally driven at 150 MHz for continuous operation, the optimal lighting frequency will typically be on the order of 1–5 MHz above the continuous operating frequency.

Figure 3:
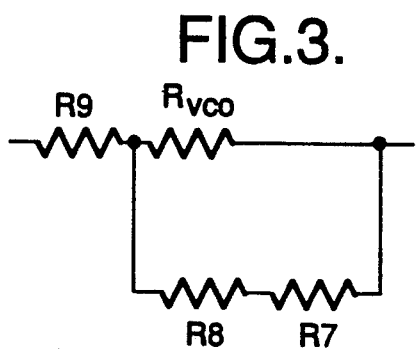
FIG. 3 is an electrical schematic diagram illustrating an equivalent circuit for calculating charge and discharge time of the present power supply.

As illustrated in FIG. 3a, the control unit 16 momentarily applies the SWEEP pulse, which has a period Tc on the order of 100 ms, to the gate of the transistor FET to light the laser 10. The SWEEP pulse turns on the transistor FET, which applies the voltage Vcc to the input of the VCO 26 through the resistor R9, and also to the capacitor CX which charges to substantially the voltage Vcc through the transistor FET during the period Tc.

The voltage Vcc is selected to correspond to a frequency on the order of 9 MHz higher than 150 MHz, or somewhat above the optimal frequency for lighting the laser 10. Upon termination of the period Tc, the capacitor CX has charged to substantially Vcc. This voltage is applied to the VCO 26, causing it to produce the output signal DRIVE at the frequency corresponding to the voltage Vcc, or approximately 159 MHz. Termination of the SWEEP pulse causes the transistor FET to be turned off, thereby disconnecting the voltage Vcc from the capacitor CX and VCO 26. As illustrated in FIG. 3b, the capacitor CX discharges through the resistors R7, R8 and R9 and the input impedance of the VCO 26 during a period Td such that the voltage across the capacitor CX, which is applied to the input of the VCO 26, decreases or sweeps downwardly from substantially Vcc toward a voltage Vo at which the synthesizer 18 is locked at approximately 150 MHz. The discharge time period Td is not critical, and may typically be on the order of 10 seconds.

As illustrated in FIG. 3c, this operation causes the frequency of the output signal DRIVE to sweep downwardly from 159 MHz toward 150 MHz during the period Td. During this sweep, the frequency will momentarily attain a value which is optimal for lighting the laser 10, for example 153 MHz, at a time designated as Ti, causing the laser 10 to be lit. The frequency of the signal DRIVE will continue to sweep downwardly to the constant value of 150 MHz, at which the laser 10, which was lit at the time Ti, will operate continuously.

The diode D1 is a reverse blocking diode which functions to disconnect the input of the VCO 26 from the output the low-pass filter 24 during the frequency sweep operation during the period Tc+Td. Whenever the voltage across the capacitor CX is higher than the voltage of the difference signal DIF, which occurs during substantially the entire period Tc+Td, the diode D1 is reverse biased, thereby enabling the sweep voltage across the capacitor CX to override the difference signal DIF.

The charge and discharge time constants of the capacitor CX in combination with the associated resistances in the circuit are selected such that the capacitor CX charges relatively quickly during the time period Tc and discharges relatively slowly during the time period Td. The frequency of the signal DRIVE thereby sweeps downward relatively slowly through the optimal frequency at which the laser 10 is lit, and continues to sweep down to the optimal continuous drive frequency. There are no critical timing or temperature drift conditions for the synthesizer 18 as long as the sweep begins at a frequency higher than that required for lighting the laser.

The frequency at which the sweep begins, which is determined by Vcc, can be set very high to ensure adequate sweep when considering production variances in VCO parameters and temperature effects.

It is essential for proper operation of the synthesizer 18 that the beat frequency caused by beating of the signal DRIVE with the signal REF be greatly attenuated. If this beat frequency modulates the VCO 26, sidebands will be produced in the spectrum of the output signal DRIVE. The output signal DRIVE will have sidebands at frequencies corresponding to the sum and difference of the reference frequency and the beat frequency (and harmonics thereof).

The beat frequency is only a concern regarding electromagnetic interference (EMI). The system may require a notch filter in the signal processor (not shown) to eliminate radiated pick-up from the RF power supply. Therefore, it is important to keep the spectrum of the RF power supply as narrow as possible by eliminating the beat frequencies. In some cases, this may not be a problem.

The beat frequency may be reduced to a negligible level by making the frequency of the reference signal REF very high relative to the loop bandwidth of the synthesizer 18. The frequency stability of the synthesizer 18 is determined by the frequency stability of the reference oscillator 20. The ability of the synthesizer 18 to track the reference oscillator frequency is determined by the loop bandwidth. A loop bandwidth on the order of approximately 25 KHz is appropriate for the synthesizer 18, since the phase noise in commercially available VCOs is typically attenuated by $-80$ dBc at frequencies greater than 10 KHz.

Further attenuation of the beat frequency can be achieved by providing additional poles or low pass filters at appropriate locations in the synthesizer 18. The resistor R1 and capacitor C1 constitute one such additional pole in the upper branch of the input to the low pass filter 24, whereas the resistor R2 and capacitor C2 constitute a corresponding additional pole in the lower branch thereof. The resistor R8 and capacitor C5 constitute an additional pole between the output of the low pass filter 24 and the input of the VCO 26.

An equivalent circuit for calculating the charge and discharge time constants of the capacitor CX is illustrated in FIG. 4. When the transistor FET switch is closed (the transistor FET is turned on by the SWEEP pulse), the capacitor CX charges with a time constant $T_c$, where $$t_c = CX(R_s + R_p)$$

where $R_s$ is the source to drain resistance of the transistor FET while it is turned on by the SWEEP pulse, and $R_p$ is the source impedance of the power source 14 which produces the voltage Vcc.

Upon termination of the SWEEP pulse, the transistor FET is turned off, and the capacitor CX discharges with a time constant $T_d$, where $$t_d = CX\left[R9 + \frac{R_{vco}(R7 + R8)}{R_{vco} + R7 + R8}\right]$$

The main elements of the synthesizer 18 may be assembled from commercially available components. For example, the phase detector 22 may include an Motorola MC4344 integrated circuit (IC), the operational amplifier OA a Precision Monolithics OP27 IC, the VCO 26 a Motorola MC1648 IC, and the frequency divider 28 a Plessey SP8716 IC.

While an illustrative embodiment of the invention has been shown and described, numerous variations and alternate embodiments will occur to those skilled in the art, without departing from the spirit and scope of the invention. Accordingly, it is intended that the present invention not be limited solely to the specifically described illustrative embodiment. Various modifications are contemplated and can be made without departing from the spirit and scope of the invention as defined by the appended claims.

I claim:

1. A radio frequency (RF) power supply for a $CO_2$ waveguide laser, comprising:
    phase-locked-loop frequency synthesizer means for normally generating an RF laser drive signal at a first predetermined frequency for continuous laser operation; and
    frequency sweeping means for causing the synthesizer means to sweep the frequency of the drive signal downwardly from a second predetermined frequency which is higher than the first predetermined frequency, through an intermediate third predetermined frequency for laser lighting, to the first predetermined frequency.

2. A power supply as in claim in which the frequency sweeping means is constructed to cause the synthesizer means to sweep the frequency of the drive signal from the second predetermined frequency to the first predetermined frequency during a predetermined period of time which is optimal for laser lighting.

3. A power supply as in claim 1, in which:
    the synthesizer means comprises:
        reference oscillator means for generating an RF reference signal at a fourth predetermined frequency;
        phase detector means for receiving the reference signal and drive signal and producing a difference signal having a voltage corresponding to the phase difference therebetween;
        low pass filter means for receiving the difference signal from the phase detector means and removing RF signal components therefrom; and
        voltage-controlled oscillator (VCO) means for receiving the difference signal from the low pass filter means and normally generating the drive signal at a frequency corresponding to the voltage of the difference signal, the difference signal normally having a first predetermined voltage which corresponds to the first predetermined frequency; and the frequency sweeping means is constructed to apply a frequency sweeping signal to the VCO means which overrides the difference signal and has a voltage that sweeps from a second predetermined voltage corresponding to the second predetermined frequency to the first predetermined voltage.

4. A power supply as in claim 3, in which:

the VCO means has an input for receiving the difference signal from the low pass filter means; and capacitance means connected across the input of the VCO means and having a time constant corresponding to a predetermined period of time which is optimal for laser lighting; and charging means for charging the capacitance means to the second predetermined voltage and subsequently allowing the capacitance means to discharge.

5. A power supply as in claim 4, in which the frequency sweeping means further comprises a reverse blocking diode connected between the low pass filter means and the capacitance means which is reverse biased when the capacitance means is charged to a voltage higher than the voltage of the difference signal.

6. A power supply as in claim 4, in which the capacitance means comprises a capacitor and a resistor connected in series across the input of the VCO means.

7. A power supply as in claim 4, in which the charging means comprises:

voltage source means for generating a direct current signal having substantially the second voltage; and switch means for momentarily connecting the voltage source means to the charging means.

8. A power supply as in claim 7, in which the switch means comprises a transistor switch.

9. A power supply as in claim 3, in which the synthesizer means further comprises beat frequency filter means for attenuating a beat signal generated by beating between the reference signal and the drive signal.

10. A power supply as in claim 3, in which the low pass filter means comprises beat frequency filter means for attenuating a beat signal generated by beating between the reference signal and the drive signal.

11. A power supply as in claim 3, further comprising beat frequency filter means connected between the low pass filter means and the VCO means for attenuating a beat signal generated by beating between the reference signal and the drive signal.

12. A power supply as in claim 3, in which:

the VCO means has an output at which the drive signal appears;

the synthesizer means further comprises frequency divider means connected between the output of the VCO means and the phase detector means; and the first predetermined frequency is higher than the fourth predetermined frequency.

13. A radio frequency (RF) power supply comprising:

phase-locked-loop frequency synthesizer means for normally generating an output signal at a first predetermined frequency; and frequency sweeping means for causing the synthesizer means to sweep the frequency of the output signal downwardly from a second predetermined frequency which is higher than the first predetermined frequency to the first predetermined frequency;

the synthesizer means comprising:

reference oscillator means for generating an RF reference signal at a third predetermined frequency;

phase detector means for receiving the reference signal and output signal and producing a difference signal having a voltage corresponding to the phase difference therebetween;

low pass filter means for receiving the difference signal from the phase detector means and removing RF signal components therefrom; and voltage-controlled oscillator (VCO) means for receiving the difference signal from the low pass filter means and normally generating the output signal at a frequency corresponding to the voltage of the difference signal, the difference signal normally having a first predetermined voltage which corresponds to the first predetermined frequency;

the frequency sweeping means being constructed to apply a frequency sweeping signal to the VCO means which overrides the difference signal and has a voltage that sweeps from a second predetermined voltage corresponding to the second predetermined frequency to the first predetermined voltage.

14. A power supply as in claim 13, in which:

the VCO means has an input for receiving the difference signal from the low pass filter means; and the frequency sweeping means comprises:

capacitance means connected across the input of the VCO means and having a predetermined time constant; and charging means for charging the capacitance means to the second predetermined voltage and subsequently allowing the capacitance means to discharge.

15. A power supply as in claim 14, in which the frequency sweeping means further comprises a reverse blocking diode connected between the low pass filter means and the capacitance means which is reverse biased when the capacitance means is charged to a voltage higher than the voltage of the difference signal.

16. A power supply as in claim 14, in which the capacitance means comprises a capacitor and a resistor connected in series across the input of the VCO means.

17. A power supply as in claim 14, in which the charging means comprises:

voltage source means for generating a direct current signal having substantially the second voltage; and switch means for momentarily connecting the voltage source means to the charging means.

18. A power supply as in claim 17, in which the switch means comprises a transistor switch.

19. A power supply as in claim 13, in which the synthesizer means further comprises beat frequency filter means for attenuating a beat signal generated by beating between the reference signal and the output signal.

20. A power supply as in claim 13, in which the low pass filter means comprises beat frequency filter means for attenuating a beat signal generated by beating between the reference signal and the output signal.

21. A power supply as in claim 13, further comprising beat frequency filter means connected between the low pass filter means and the VCO means for attenuating a beat signal generated by beating between the reference signal and the output signal.

22. A power supply as in claim 13, in which:

the VCO means has an output at which the output signal appears;

the synthesizer means further comprises frequency divider means connected between the output of the VCO means and the phase detector means; and the first predetermined frequency is higher than the third predetermined frequency.

* * * * *

UNITED STATES PATENT AND TRADEMARK OFFICE
CERTIFICATE OF CORRECTION

PATENT NO. : 5,150,372
DATED : September 22, 1992
INVENTOR(S) : Charles E. Nourrcier It is certified that error appears in the above-identified patent and that said Letters Patent is hereby corrected as shown below:

Column 4, line 27, change "3a" to --2a--.

Column 4, line 47, change "3b" to --2b--.

Column 4, line 56, change "3c" to --2c--.

Column 5, line 67, change "4" to --3--.

Column 6, line 20, change "an" to --a--.

Signed and Sealed this

Twelfth Day of October, 1993

*Attest:*

BRUCE LEHMAN

*Attesting Officer*      Commissioner of Patents and Trademarks